(12) United States Patent
Pallakoff et al.

(10) Patent No.: US 9,953,354 B2
(45) Date of Patent: Apr. 24, 2018

(54) SYSTEM AND METHOD FOR PROVIDING PRODUCT INFORMATION

(71) Applicant: barnesandnoble.com llc, New York, NY (US)

(72) Inventors: Matthew Pallakoff, Mountain View, CA (US); Harold Edward Cohn, Incline Village, NV (US)

(73) Assignee: NOOK DIGITAL, LLC, New York, NY (US)

( * ) Notice: Subject to any disclaimer, the term of this patent is extended or adjusted under 35 U.S.C. 154(b) by 0 days.

(21) Appl. No.: 13/687,891

(22) Filed: Nov. 28, 2012

(65) Prior Publication Data

US 2013/0134213 A1     May 30, 2013

Related U.S. Application Data

(60) Provisional application No. 61/564,767, filed on Nov. 29, 2011.

(51) Int. Cl.
*G06Q 30/06*     (2012.01)
*G06Q 30/00*     (2012.01)

(52) U.S. Cl.
CPC ......... *G06Q 30/0623* (2013.01); *G06Q 30/00* (2013.01)

(58) Field of Classification Search
CPC ........... G06K 7/10851; G06K 7/10881; G06K 17/0022; G06K 2207/1012; G06K 2207/1016; G06Q 10/087; G06Q 10/08; G06Q 10/06; G06Q 30/02; G06Q 30/0623; G06Q 30/00; G07G 1/009

USPC ........... 235/472.01, 462.45, 462.01, 462.22, 235/462.32, 375, 385
See application file for complete search history.

(56) References Cited

U.S. PATENT DOCUMENTS

| | | | |
|---|---|---|---|
| 2007/0285242 A1* | 12/2007 | Higham | 340/572.1 |
| 2008/0128492 A1* | 6/2008 | Roth et al. | 235/380 |
| 2009/0111484 A1* | 4/2009 | Koch | G06Q 10/08 455/456.1 |
| 2010/0077323 A1* | 3/2010 | Hunter | 715/760 |
| 2010/0294840 A1* | 11/2010 | Barry | B01L 3/5453 235/462.01 |
| 2011/0248848 A1* | 10/2011 | Reeves | G08B 13/2417 340/540 |
| 2012/0085828 A1* | 4/2012 | Ziegler | 235/493 |

(Continued)

FOREIGN PATENT DOCUMENTS

WO     WO 2005060699 A2 *     7/2005

*Primary Examiner* — Sonji Johnson
(74) *Attorney, Agent, or Firm* — The Law Office of Michael J. Scheer

(57) ABSTRACT

A system and method of associating an NFC tag to a product and transmitting information about the product are described. An electronic device is used to scan a generic NFC tag affixed to a product to obtain a unique ID code as well as other indicia identifying the product itself, such as a bar code. The unique ID and bar code are then transmitted to a central server, where they are associated with one another and stored in a database. Once associated, a customer may use a separate electronic device, such as a mobile phone or tablet, to scan a product of interest, transmit the unique ID code to the central server, and retrieve from the central server information about the product.

19 Claims, 4 Drawing Sheets

(56) References Cited

U.S. PATENT DOCUMENTS

2013/0048721 A1* 2/2013 Rasband ........... G06F 17/30879
                                                    235/383
2013/0110728 A1* 5/2013 Kobres .......................... 705/75

* cited by examiner

SYSTEM AND METHOD FOR PROVIDING PRODUCT INFORMATION

FIELD OF THE INVENTION

The present invention generally relates to systems and methods for providing product information, and more particularly to systems and methods for providing product information using near field communication tagging.

BACKGROUND OF THE INVENTION

There are a growing number of applications that require very short range wireless communications, such as Near Field Communication ("NFC"). NFC is a standards-based technology used to provide short range wireless connectivity technology for carrying secure two-way interactions between electronic devices. NFC equipment and elements from a variety of manufacturers can be used together. NFC standards set forth parameters for both the contactless operating environment and the acceptable data formats and data transfer rates to be used in NFC communications.

NFC is a form of Radio Frequency Identification ("RFID") that permits contactless communication up to distances of about 4 or 5 centimeters. NFC utilizes inductive-coupling at a license-free frequency of 13.56 MHz, with communication channels between devices being established in a simple and automated manner. This enables users to connect to and transfer digital content between different devices by touching the devices together or bringing them within close proximity to one another. Since NFC communications occur over only short distances, communications are inherently more secure, especially since devices usually come into proximity only when a user intends as such. Being a wireless technology, NFC also avoids disadvantages of contact communications, such as problems with poor electrical contacts and physical abuse. Both of these advantages are critical to the success of NFC.

SUMMARY OF THE INVENTION

In a first aspect of the present invention, customers in a retail environment conveniently "tap" an NFC enabled device against a product (or bring the device in close proximity to the product), such as a physical book, promotional item or media, to obtain information about the product and to present options that permit interaction with the product. The NFC enabled device obtains information from an NFC "tag" placed on the product. In a preferred embodiment, the NFC tag is a passive device that transfers information, e.g., an ID uniquely associated with that tag and a website URL or application identifier to an NFC enabled device. The device uses the information in conjunction with remote software services or data sources to fetch information about the tagged product. The process may also permit customers to immediately purchase or download a digital sample of the product, if available, e.g., a digital publication or eBook. The product information may include, but is not limited to, reviews, friend recommendations, bookseller recommendations, online author interviews, discussion forums, coupons, promotions, and/or book signing events. In this manner, the present invention opens a universe of online information about a product without need for a user to conduct a manual search, e.g., on a mobile device.

A second aspect of the present invention comprises a method of efficiently programming generic NFC tags that can be pre-applied at a warehouse or applied at a store level to books and products that will eventually be scanned by customers. As part of the programming process, low-cost, pre-printed, inexpensive, and generic NFC tags are employed. These generic tags contain a globally unique identifier ("GUID"). As used herein, the term GUID is intended to encompass any and all indicia that can be used to uniquely identify a tag. The generic NFC tags may also contain customizable information, such as a Uniform Resource Identifier ("URI") in an appropriate format, such as the NFC Data Exchange Format ("NDEF") or another format set forth by the NFC Forum.

To program a tag, a bookseller or clerk affixes a company-branded NFC tag to a product (e.g., on a book cover) or to a product package. With a commercially available mobile device, e.g., mobile phone, the clerk takes a photo of the Universal Product Code ("UPC") on the book or product. The clerk then scans the NFC tag he/she just applied to the product to obtain a unique GUID code and other information. This unique ID code and the UPC code are then sent over the Internet to remote computers and/or servers, which associate the information and store it for later retrieval. This programming or association process takes only approximately 5 to 15 seconds for each product.

As appreciated by those skilled in the art, the first and second aspect of the present invention can be combined. Specifically, an employee may scan an NFC tag for a particular product in accordance with the second aspect of the invention described above. Later, when a customer taps the tag on a given product using an NFC-enabled device, software on the device can send the unique GUID of the NFC tag to the remote server, which returns the associated product ID or related product information. This information can then be used by software on the device to present information and interaction options related to the tapped product, e.g., "Would you like to buy this book, or buy a sample?"

The NEC tags and the tagging process of the present invention bridges physical products with the online world. These tags allow users, armed with mobile devices, to access a plethora of additional information concerning products under consideration for purchase, beyond what is available on the cover or packaging. The tags also facilitate the purchase and download of electronic content. It is also possible to cross-promote other products, books, café items, toys with promotions, coupons, and to suggest gifting during the tagging process.

The present invention solves many of the problems of conventional processes for programming NFC tags. If one were to pre-print tags associated with books and products, the process of correlating tags to products becomes virtually unmanageable for store employees. The employees would have to painstakingly find the right tag for the product, potentially out of many thousands of products. Back-end tag pre-programming systems have to be kept in sync with inventory systems, so that if the store stocked 10,000 copies of one book and 500 copies of a second book, the corresponding number of tags would be pre-programmed and sorted, with the complexity multiplied by thousands of different books. The present invention eliminates the need to pre-program and pre-sort tags.

The invention also dispenses with the need for a manufacturer or distributor to include NFC tags on the product or packaging during the manufacturing or distribution process. While manufacturer affixed tags may be desirable long-term, the costs and lack of incentives for manufacturers and distributors to include these tags may prove a significant barrier in the short-term.

The invention may also increase sales and customer exposure. Conventionally, customers write down product names (e.g., book EAN numbers), either on paper or on their mobile device, and search manually online for additional product information. This gives the customer an opportunity to cross-shop at other retail locations, which is not desirable. The present invention supplies a significant amount of meta-information about a product and provides the customer with the ability to buy the product immediately, thereby reducing the likelihood he/she may shop elsewhere. The invention also increases customer exposure, as products with branded tags may be shared allowing other users to tap and retrieve information as well.

The present invention has many other uses as well. For example, a customer with an NFC enabled device can tap items of interest throughout a physical store and decide before or at checkout which products to purchase. In certain embodiments of the present invention, the customer electronically communicates the list to a clerk, who retrieves the products for sale. Since these items have been pre-identified by the user via tags, the items need not be scanned by the checker, but rather simply entered into the Point of Sale ("POS") system. This process is very beneficial when checking out many items.

Certain embodiments of the present invention also allow customers to use their mobile devices to collect a list of products in a wish list or tagging history, while browsing in a physical retail store. The wish list or tagging history can later be used to purchase those items, or may be transferred to a relative or friend.

BRIEF DESCRIPTION OF THE DRAWINGS

For the purposes of illustrating the present invention, there is shown in the drawings a form which is presently preferred, it being understood however, that the invention is not limited to the precise form shown by the drawing in which.

DETAILED DESCRIPTION OF THE INVENTION

Figure 1:
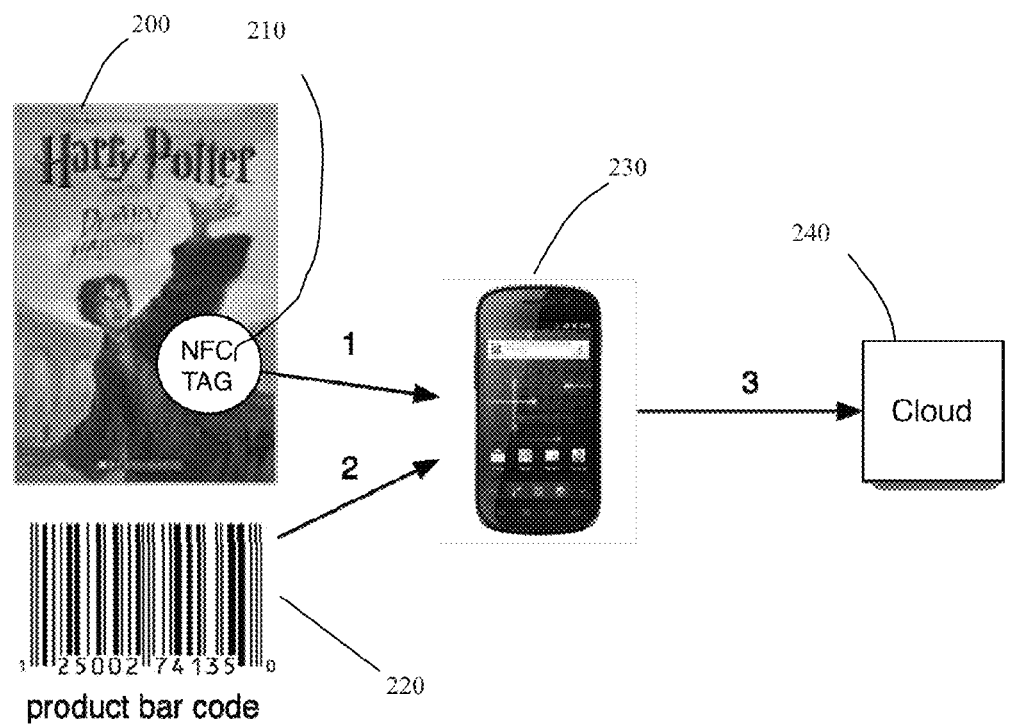
FIG. 1 illustrates a process of programming tags.

The present invention allows for the creation of ad hoc NFC tags that are applied to some or all products within a retail environment. This allows customers to use their NFC enabled devices to tap those tags and receive more information or purchase electronic content immediately.

An exemplary process according to the present invention starts with a generic NFC tag as provided by an NFC tag manufacturer. These tags include a globally unique GUID that uniquely identifies each generic tag. The tag manufacturer pre-programs a single application message for each tag formatted in accordance with NDEF, such that the messages are all the same except for the unique identifiers. The application NDEF message might be a URI such as "http://nfc.bn.com/prodructid." This product ID, and potentially other information retrieved from the tag, is used to launch an application or website on the mobile device that pertains to the in-store use case described above. The website can provide product meta data, an option to purchase the product and/or can provide a link to install an application on the device to enhance the user's experience.

The generic, but unique, tags are sent to a retail store where clerks apply them to products, e.g., front covers of books, perhaps in a back room of the retail location. The clerk then uses a pre-selected, pre-approved mobile device (e.g., Google Nexus S) that has both a capable camera and an NFC reader. The clerk uses the mobile device to scan the tag of a product for its GUID and to take a photo of the product's bar code. The clerk then transmits the GUID and photo of the bar code to a central server, where the two pieces of information are associated and stored. In other embodiments, the clerk uses the mobile device itself to associate the GUID with the bar code, e.g., by pressing an appropriate button, before the associated information is transmitted to the central server and stored. A photo of the book cover might also appear on the mobile device to help the clerk ensure that the product is correctly associated with the tag's GUID.

In a preferred embodiment, the process performed by the store clerk. i.e., scanning the product code and the NFC tag and sending the info to a central database, can be performed with the help of a custom software application on the mobile device that the clerk is using. For example, in the preferred embodiment of a retail book location, the application can prompt the clerk to scan the book's product code with the camera and then prompt the clerk to tap the book's NFC tag to read the NFC tag. The application can give the clerk the opportunity to review the two pieces of data to verify their accuracy, and provide the clerk the opportunity to tap a "send" button to send the information to the central database, or tap a "cancel" button if they decided not to the send the information. The clerk can use the custom application to repeat this process on the next book. As further described above, the custom application can also provide the explicit linkage between the product code and the NFC tag affixed to the product before this data is sent to the central database.

The clerk repeats the process with each product to be processed. If the clerk wishes to apply tags to an entire box of the same product, i.e., if all products in a group have the same bar code (e.g., a box of numerous copies of Harry Potter and the Goblet of Fire), the present invention allows the clerk to scan the bar code only once, and then tap each product tag in an assembly-line fashion to associate the unique IDs to the bar code. In this alternative embodiment, one person could program the tags while another applies them to book covers. Once tagged, the clerk distributes the books within the store for customers to scan.

This process can be further automated to employ a machine to perform the repetitive scanning of items. For example, a conveyor belt can run each item under a bar code scanner (to scan the product code) and an NFC tag reader (to scan the NFC tag). The scanners are attached to a computer that transmits the information regarding the product and the attached NFC tag to the remote central server.

In the event a tag's GUID was associated with the wrong product, the present invention allows the clerk to use the mobile device to re-associate the tag ID to the correct product on the spot, as the generic tags do not themselves contain information associated with any particular product. This functionality may prove useful, for example, if a customer scans a product and retrieves the wrong product information.

Referring now to FIG. 1, there is seen a diagram depicting a process of programming tags. As shown, a product 200 includes a product bar code 220 and a generic NFC tag 210 affixed to a portion of the product, for example, a front cover of a book. A clerk uses a mobile device 230 to scan both the NFC tag 210 (1) for the unique QUID and the product bar code 220 (2) on the product 220. The mobile device 230 then communicates (3) the pair of information to cloud 240, e.g., a remote computer processing facility. Cloud 240 then associates the unique QUID with the product and stores the association. The clerk then moves onto the next tag and repeats the process for each product 200 to be programmed. It should be appreciated that the association of the unique GUID with the product (or product bar code) may be performed by another device or system other than cloud 240. For example, mobile device 230 itself may associate the information and transmit the associated information to cloud 240, which would then need only store the associated information for future retrieval.

Cloud 240 need not associate (or link) a unique GUID with a single product, but rather may associate the GUID with more than one product or a group of products. For example, cloud 240 may link a GUID to a "Top 100" book list, book category (e.g., Fiction), a bookshelf or section of a shelf. GUIDs may also be linked to a promotion of books, e.g., a promotion for Father's Day, when the corresponding tags are applied to posters, postcards, bookmarks and the like. The invention also permits bar codes, ISBN code, Quick Response codes, QR codes, and book covers to be scanned to identify product contents in various combinations. It should be appreciated, however, that regardless of which products or promotions are associated to a particular GUID of a tag, the present invention permits the association to be programmed in the same way, regardless of application.

In accordance with another embodiment of the present invention, a series of tags with random ids are pre-programmed with product identifiers assigned to particular products. In this embodiment, the association of the tag id and the book id is made prior to the placement of the tag on the book. This embodiment, however, is somewhat more costly because the manufacture of such tags is more complex. Additional costs would also be incurred at the store level, as product-specific tags would need to be sorted before personnel can apply them to associated products. If the tags embed a URL to the central server website, the URL can also contain a random unique hash code that can also be looked up internally. This method would virtually prevent NFC tag id theft. Even if a potential miscreant were to get the code from the server via the URL, it would only be valid for that tag, not all the other tags on the same book.

Since the NFC tags of the present invention contain only generic GUIDs (not product Ids), mobile applications of competitors cannot easily reverse-engineer the GUIDs to determine which products are associated with the tags. The association is performed only by cloud 240 or by the clerk's mobile device 230, neither of which are accessible to competitors.

Figure 2:
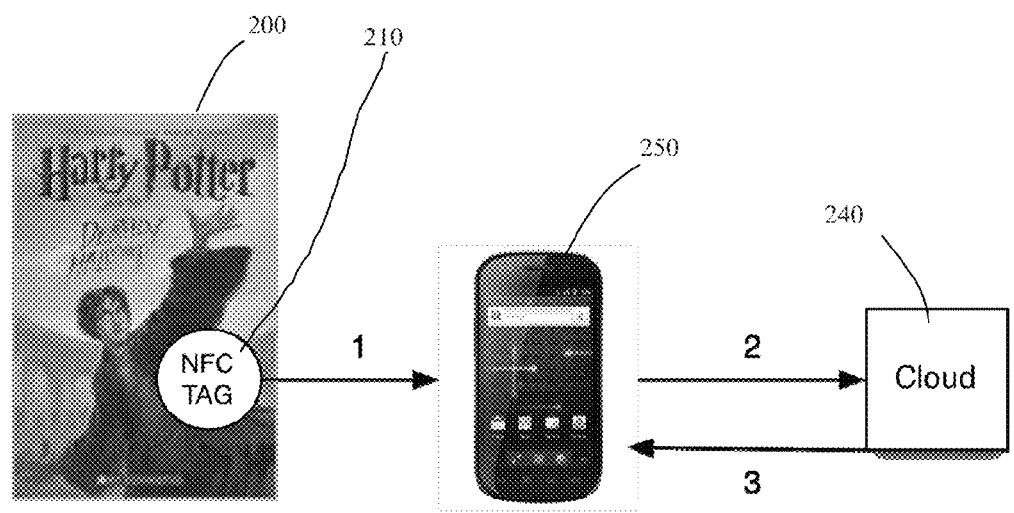
FIG. 2 illustrates the process of providing a customer with product information.

Referring now to FIG. 2, there is seen a diagram depicting a process of providing a customer with product information after NFC tag 210 and product bar code 220 of product 200 have been associated. A customer taps NFC tag 210 to retrieve the unique GUID associated with tag 210. The customer's device 250 then communicates this information to cloud 240, which searches its storage to determine which product is associated with the GUID of tag 210. Once the associated product is determined, cloud 240 instructs customer device 250 to launch a browser application with an appropriate URL to deliver information about the product to the customer. It should also be appreciated that cloud 240 may deliver the information about the product via means other than a browser, such as via a peer-to-peer communication or via an application downloaded and stored on the customer's mobile device 250.

Figure 3:
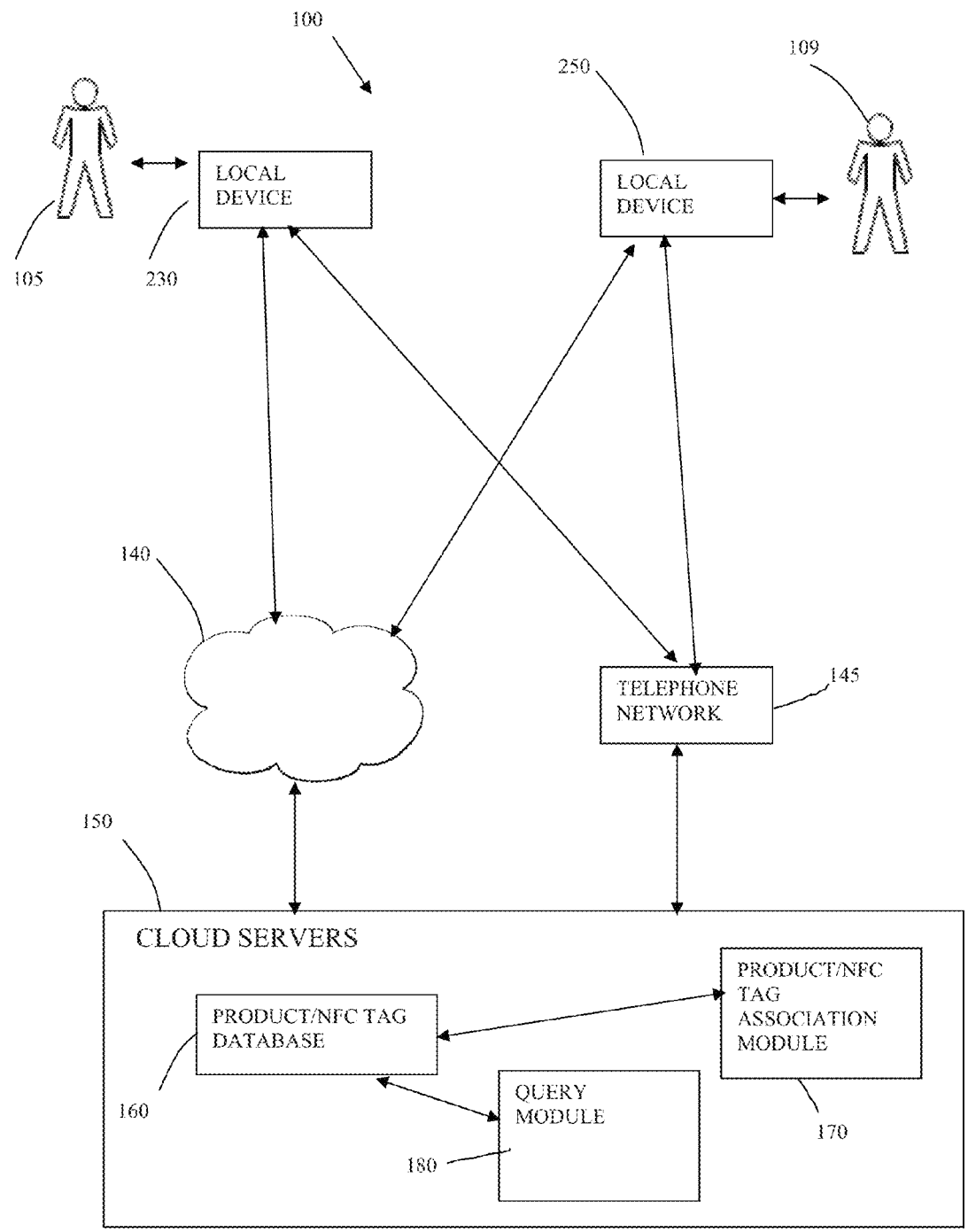
FIG. 3 illustrates an exemplary system according to the present invention.

Referring now to FIG. 3, there is seen a diagram of components of a system 100 according to the present invention. FIG. 3 includes a retail clerk 105 and customer 109. Clerk 105 uses his/her local device 230 for scanning/tapping tags placed on products for association, as well as for communicating with cloud/server 150. Customer 109 uses his/her local device 250 for scanning/tapping the tags and retrieving additional information about the associated products. Many of the functions of system 100 of the present invention are carried out on cloud/server 150. As appreciated by those skilled in the art, certain functions may be divided between cloud/server 150 and the clerk's 105 and customer's 109 local devices 230, 250. Cloud/server 150 may also be considered a "cloud" in and of itself and may be comprised of several servers performing interconnected and distributed functions. For the sake of simplicity only, a single cloud/server 150 is described with respect to FIG. 3. Clerk 105 and customer 109 may connect to cloud/server 150 via the Internet 140, a telephone network 145 (e.g., wirelessly through a cellphone network) or other suitable electronic communication means. As appreciated by those skilled in the art, the number of clerks 105 and customers 109 that employ the present invention at the same time is limited only by the scalability of cloud/server 150.

Local device 230 is an electronic device, such as a personal computer, a smart phone or other electronic device, that clerk 105 uses to capture a product's NFC tag information (e.g., a unique GUID) as well as the UPC information associated with the product. In a preferred embodiment, local device 230 has been previously associated, or registered, with cloud/server 150 via a secure interface through telephone network 145 (typically a cellular network for mobile devices) or Internet 140.

After clerk 105 scans a product's UPC code and its associated tag to retrieve a unique GUID (or other unique information), local device 230 interacts with Product/NFC Tag Association Module 170 of cloud/server 150 to associate the unique GUID to the product's UPC code, or to the product itself. Once the association has been made, server/cloud 150 stores the associated information in database 160.

After the NFC tag has been associated with the product, customer 109 can tap the tag with his/her local device 250, thereby causing local device 250 to interact with query module 180 of server/cloud 150 to retrieve information regarding the product.

Figure 4:
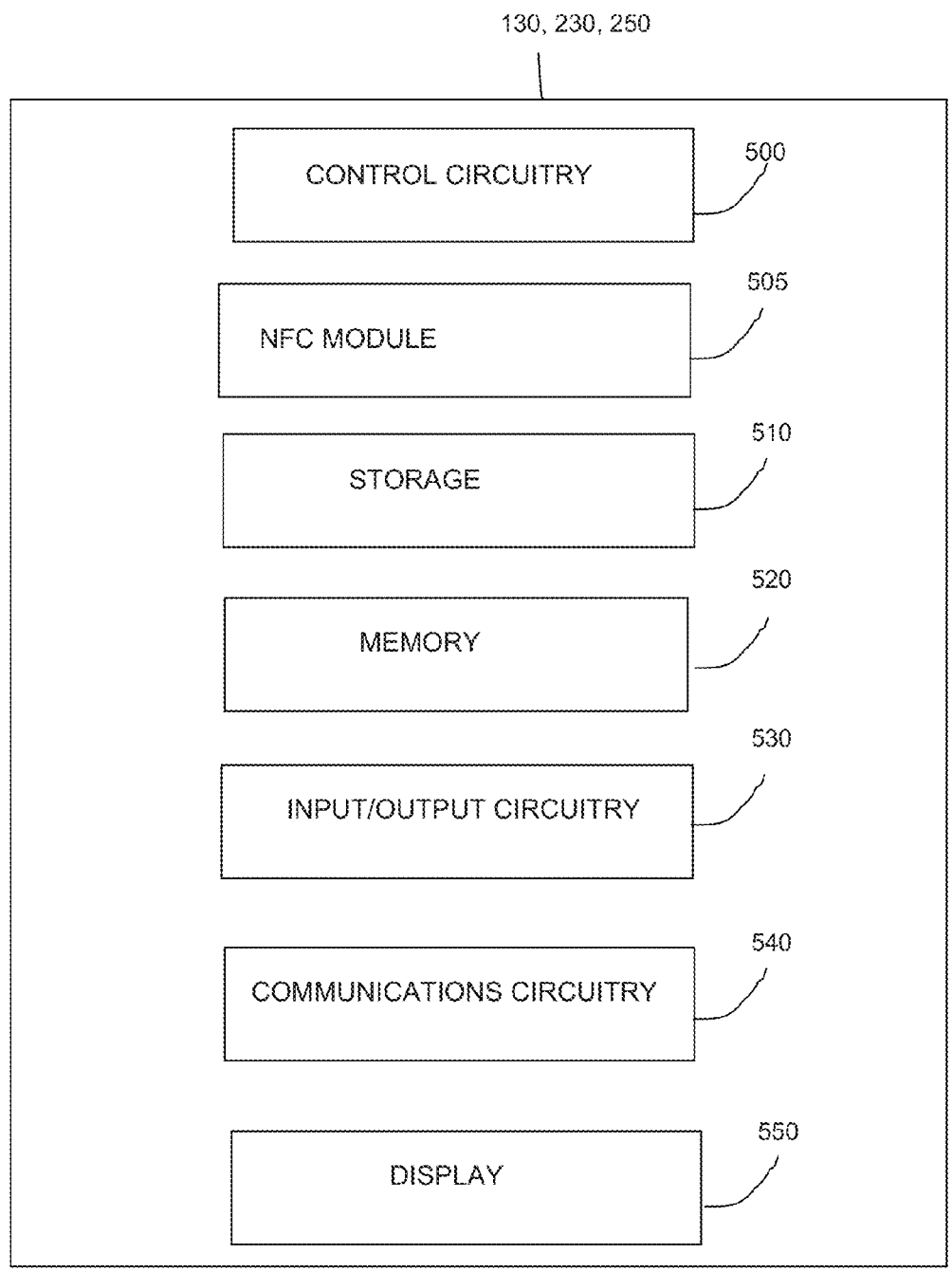
FIG. 4 illustrates the components of an exemplary device.

Referring now to FIG. 4, there is seen components of local devices 230, 250 in block form. As appreciated by those skilled the art, local devices 230, 250 (referred to individually or collectively in FIG. 4 as electronic device 130), can take many forms. As previously described, in a preferred embodiment, electronic device 130 is a mobile electronic device and may include control circuitry 500, storage 510, memory 520, input/output ("I/O") circuitry 530, communications circuitry 540, and display 550. In some embodiments, one or more of the components of electronic device 130 may be combined or omitted or combined, e.g., storage 510 and memory 520 may be combined. As appreciated by those skilled in the art, electronic device 130 may include other components not combined or included in those shown in this Figure, e.g., a power supply such as a battery, an input mechanism, etc.

Electronic device 130 may include any suitable type of electronic device. For example, electronic device 130 may include a portable electronic device that clerk 105 or customer 109 may hold in his or her hand, such as a digital media player, a personal e-mail device, a personal data assistant ("PDA"), a cellular telephone, a handheld gaming device, a tablet device an eBook reader, or the like. As another example, electronic device 130 may include larger portable electronic devices, such as a laptop computer.

Control circuitry 500 may include any processing circuitry or processor operative to control the operations and performance of electronic device 130. For example, control circuitry 500 may be used to run operating system applications, firmware applications, media playback applications, media editing applications, or any other application. Control circuitry 500 may drive display 550 and process inputs received from a user interface, e.g., display 550, if display 550 is a touch screen.

NFC Module 505 includes hardware and software required to perform the NFC scanning operations described herein. NFC data scanned by NFC Module 505 is fed to control circuitry 500 for processing as described above.

Storage 510 can include, for example, one or more computer readable storage mediums including a hard-drive, solid state drive, flash memory, permanent memory such as ROM, magnetic, optical, semiconductor, paper, or any other suitable type of storage component, or any combination thereof. Storage 510 may store, for example, media content, e.g., eBooks, music and video files, application data, e.g., software for implementing functions on electronic device 130, firmware, user preference information data, e.g., content preferences, authentication information, e.g., libraries of data associated with authorized users, transaction information data, e.g., information such as credit card information, wireless connection information data, e.g., information that enables electronic device 130 to establish a wireless connection, subscription information data, e.g., information that keeps track of podcasts or television shows or other media a user subscribes to, contact information data, e.g., telephone numbers and email addresses, calendar information data, and any other suitable data or any combination thereof.

Memory 520 may include cache memory, semi-permanent memory such as RAM, and/or one or more different types of memory used for temporarily storing data. In some embodiments, memory 520 may also be used for storing data used to operate electronic device applications, or any other type of data that can be stored in storage 510. In some embodiments, memory 520 and storage 510 are combined as a single storage medium.

I/O circuitry 530 may be operative to convert, and encode/decode if necessary, analog signals and other signals into digital data. In some embodiments, I/O circuitry 530 converts digital data into any other type of signal, and vice-versa. For example, I/O circuitry 530 may receive and convert physical contact inputs, e.g., from a multi-touch screen, i.e., display 550, physical movements, e.g., from a mouse or sensor, analog audio signals, e.g., from a microphone, or any other input. The digital data may be provided to and received from control circuitry 500, storage 510, and memory 520, or any other component of electronic devices 230, 250. Although I/O circuitry 530 is illustrated in this Figure as a single component of electronic device 130, several instances of I/O circuitry 530 may be included in electronic device 130.

Electronic device 130 may include any suitable interface or component for allowing a user to provide inputs to I/O circuitry 530. For example, electronic device 130 may include any suitable input mechanism, such as a button, keypad, dial, a click wheel, or a touch screen, e.g., display 550. In some embodiments, electronic device 130 includes a capacitive sensing mechanism, or a multi-touch capacitive sensing mechanism.

In some embodiments, electronic devices 230, 250 may include specialized output circuitry associated with output devices such as, for example, one or more audio outputs. The audio output can include one or more speakers, e.g., mono or stereo speakers, built into electronic device 130 or an audio component that is remotely coupled to electronic device 130, e.g., a headset, headphones or earbuds that can be coupled to electronic device 130 wirelessly or with a wire.

Display 550 includes the display and circuitry for providing a display visible to the user. For example, the display circuitry may include a screen, e.g., an LCD screen that is incorporated in electronic device 130. In some embodiments, the display circuitry includes a coder/decoder (Codec) to convert digital media data into analog signals. For example, the display circuitry or other appropriate circuitry within electronic device may include video Codecs, audio Codecs, or any other suitable type of Codec.

The display circuitry also may include display driver circuitry, circuitry for driving display drivers, or both. The display circuitry may be operative to display content, e.g., media playback information, application screens for applications implemented on electronic device 130, information regarding ongoing communications operations, information regarding incoming communications requests, or device operation screens, under the direction of control circuitry 500. Alternatively, the display circuitry may be operative to provide instructions to a remote display.

Communications circuitry 540 may include any suitable communications circuitry operative to connect to a communications network and to transmit communications, e.g., data from electronic device 130 to other devices within the communications network. Communications circuitry 540 may be operative to interface with the communications network using any suitable communications protocol such as, for example, Wi-Fi, e.g., a 802.11 protocol, Bluetooth, radio frequency systems, e.g., 900 MHz, 1.4 GHz, and 5.6 GHz communication systems, infrared, GSM, GSM plus EDGE, CDMA, quadband, and other cellular protocols, VOIP, or any other suitable protocol.

Electronic device 130 may include one more instances of communications circuitry 540 for simultaneously performing several communications operations via different communications networks, although only one is shown in FIG. 4 to for simplicity. For example, electronic device 130 may include a first instance of communications circuitry 540 for communicating over a cellular network, and a second instance of communications circuitry 540 for communicating over Wi-Fi or using Bluetooth. In some embodiments, the same instance of communications circuitry 540 may be operative to provide for communications over several communications networks.

In some embodiments, electronic device 130 is coupled to a host device such as cloud/server 150 for data transfers, synching the communications device, software or firmware updates, providing performance information to a remote source, e.g., providing riding characteristics to a remote server, or performing any other suitable operation that can require electronic device 130 to be coupled to a host device. Several electronic devices 130 may be coupled to a single host device using the host device as a server. Alternatively or additionally, electronic device 130 may be coupled to several host devices, e.g., for each of the plurality of host devices to serve as a backup for data stored in electronic device 130.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

What is claimed is:

1. A method of associating an NFC tag to a product and transmitting information about the product, the method comprising:
    scanning the NFC tag with an NFC enabled first mobile device, to obtain a unique tag identifier, wherein the NFC tag does not contain any product information;
    scanning a product code with the first mobile device to obtain a product identifier associated with the product;
    associating the unique tag identifier with the product identifier;
    storing the unique tag identifier and the product identifier in a database;
    receiving from a second mobile device a message containing the tag identifier;
    searching the database using the tag identifier to determine the product identifier associated with the product;
    obtaining product information related to the product using the determined product identifier; and
    transmitting the product information to the second mobile device.

2. The method of claim 1, wherein the product code is at least one of a bar code, ISBN code and Quick Response code.

3. The method of claim 1, wherein the product information transmitted to the second mobile device includes a URL address associated with the product.

4. The method of claim 3, wherein the URL address causes a browser on the second mobile device to display a web page that permits a user to purchase the product.

5. The method of claim 1, wherein the act of associating the unique tag identifier with the product identifier is performed by the first mobile device.

6. The method of claim 1, wherein the act of associating the unique tag identifier with the product identifier is performed by a central server.

7. A system for associating an NFC tag to a product and transmitting information about the product, the system comprising:
    a central server having a database, the central server being configured to
        receive a unique tag identifier and a product identifier from an NFC enabled first mobile device;
        associate the unique tag identifier to the product identifier associated with the product;
        store the unique tag identifier and the product identifier in the database;
        receive a message from a second mobile device, the message containing the tag identifier;
        search the database using the tag identifier to determine the product identifier associated with the product;
        obtain product information related to the product using the determined product identifier; and
        transmit the product information to the second mobile device.

8. The system of claim 7, further comprising the NFC enabled first mobile device configured to scan the NFC tag to obtain the unique tag identifier and configured to scan a product code to obtain a product identifier associated with the product, the central server receiving the unique tag identifier and the product identifier from the NFC enabled first mobile device.

9. The system of claim 8, wherein the product code is at least one of a bar code, ISBN code and Quick Response code.

10. The system of claim 8, wherein the information transmitted by the central server includes a URL address associated with the product.

11. The system of claim 10, wherein the URL address causes a browser on the second mobile device to display a web page that permits purchase of the product.

12. The system of claim 8, further comprising the second mobile device, the central server receiving the message containing the unique tag identifier from the second mobile device and transmitting the information related to the product to the second mobile device.

13. The system of claim 12, wherein the product code is at least one of a bar code, ISBN code and Quick Response code.

14. The system of claim 12, wherein the information transmitted by the central server to the second mobile device includes a URL address associated with the product.

15. The system of claim 14, wherein the URL address causes a browser on the second mobile device to display a web page that permits purchase of the product.

16. A system for associating an NFC tag to a product and transmitting information about the product, the system comprising:
    an NFC enabled first mobile device configured to scan the NFC tag to obtain a unique tag identifier and configured to scan a product code to obtain a product identifier associated with the product;
    a second mobile device configured to scan the NFC tag to obtain the unique tag identifier; and
    a central server having a database, the central server being configured to
        receive the unique tag identifier and the product identifier from the first mobile device;
        associate the unique tag identifier to the product identifier associated with the product;
        store the unique tag identifier and the product identifier in the database;
        receive a message containing the tag identifier from the second mobile device;
        search the database using the tag identifier to determine the product identifier associated with the product;
        obtain product information related to the product using the determined product identifier; and
        transmit the product information to the second mobile device.

17. The system of claim 16, wherein the product code is at least one of a bar code, ISBN code and Quick Response code.

18. The system of claim 16, wherein the information transmitted to the second mobile device includes a URL address associated with the product.

19. The system of claim 18, wherein the URL address causes a browser on the second mobile device to display a web page that permits purchase of the product.

* * * * *